(12) United States Patent
Son et al.

(10) Patent No.: US 9,132,465 B2
(45) Date of Patent: Sep. 15, 2015

(54) SYSTEM FOR MANUFACTURING MEMBRANE ELECTRODE ASSEMBLY OF FUEL CELL STACK

(71) Applicant: Hyundai Motor Company, Seoul (KR)

(72) Inventors: Hee Dong Son, Ulsan (KR); Joo Ok Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 333 days.

(21) Appl. No.: 13/715,676

(22) Filed: Dec. 14, 2012

(65) Prior Publication Data

US 2014/0060143 A1    Mar. 6, 2014

(30) Foreign Application Priority Data

Sep. 5, 2012    (KR) .................. 10-2012-0098176

(51) Int. Cl.
*B21D 31/00*    (2006.01)
*H01M 8/10*    (2006.01)

(52) U.S. Cl.
CPC ............. *B21D 31/00* (2013.01); *H01M 8/1004* (2013.01); *H01M 2008/1095* (2013.01); *Y02E 60/521* (2013.01)

(58) Field of Classification Search
CPC ...... B21D 22/02; B21D 22/022; B21D 22/06; B21D 28/00; B21D 31/00; H01M 8/00; H01M 8/1004; H01M 2008/1095; Y02E 60/521
USPC ........... 72/452.1, 452, 2, 452.4, 452.5, 452.6, 72/452.7, 450, 455, 465.1, 466.8, 72/342.1–342.96, 334; 83/153, 154, 83/158–160
See application file for complete search history.

(56) References Cited

U.S. PATENT DOCUMENTS

| | | | | |
|---|---|---|---|---|
| 4,635,461 | A | * | 1/1987 | Raymond ...................... 228/6.1 |
| 5,950,531 | A | * | 9/1999 | Uchiyama ...................... 100/353 |
| 8,316,686 | B2 | * | 11/2012 | Summers ..................... 72/466.9 |
| 2004/0173072 | A1 | * | 9/2004 | Ishii et al. ........................ 83/100 |

FOREIGN PATENT DOCUMENTS

| | | |
|---|---|---|
| JP | 2003022819 A | 1/2003 |
| JP | 2003022832 A | 1/2003 |
| JP | 2006236698 A | 9/2006 |
| JP | 2007299551 A | 11/2007 |
| KR | 10-0666786 | 1/2007 |
| KR | 10-2009-0108492 | 10/2009 |
| KR | 10-2009-0111898 | 10/2009 |

* cited by examiner

*Primary Examiner* — Shelley Self
*Assistant Examiner* — Peter Iannuzzi
(74) *Attorney, Agent, or Firm* — Mintz Levin Cohn Ferris Glovsky and Popeo, P.C.; Peter F. Corless (57) ABSTRACT

Disclosed herein is a system for manufacturing a membrane electrode assembly of a fuel cell stack, in which the concept of automation is introduced to the entire process for manufacturing the membrane electrode assembly and, in particular, bonding and stamping processes for the membrane electrode assembly and a gas diffusion layer are integrated. According to the present invention, it may be possible to reduce the installation area of the system and reduce the production cycle type, thus facilitating mass production.

5 Claims, 10 Drawing Sheets

SYSTEM FOR MANUFACTURING MEMBRANE ELECTRODE ASSEMBLY OF FUEL CELL STACK

CROSS-REFERENCE TO RELATED APPLICATION

This application claims under 35 U.S.C. §119(a) the benefit of Korean Patent Application No. 10-2012-0098176 filed Sep. 5, 2012, the entire contents of which are incorporated herein by reference.

BACKGROUND (a) Technical Field

The present invention relates to a system for manufacturing a membrane electrode assembly (MEA) of a fuel cell stack. More particularly, the present invention relates to a system for manufacturing a membrane electrode assembly of a fuel cell stack, in which the entire process for manufacturing the membrane electrode assembly is automated and, in particular, bonding and stamping processes for the membrane electrode assembly and a gas diffusion layer are integrated.

(b) Background Art

A conventional fuel cell system comprises a fuel cell stack for generating electricity by electrochemical reaction, a hydrogen supply system for supplying hydrogen as a fuel to the fuel cell stack, an oxygen (e.g., air) supply system for supplying oxygen containing air as an oxidant required for the electrochemical reaction in the fuel cell stack, a thermal management system (TMS) for removing reaction heat from the fuel cell stack to the exterior of the fuel cell system, controlling operation temperature of the fuel cell stack, and performing water management function, and a system controller for controlling overall operation of the fuel cell system.

The fuel cell stack comprises a membrane electrode assembly, a gas diffusion layer (GDL), a gasket, a sealing member, and a bipolar plate separator. The MEA includes a polymer electrolyte membrane through which hydrogen ions are transported. An electrode/catalyst layer, in which an electrochemical reaction takes place is disposed on both sides of the polymer electrolyte membrane. The GDL uniformly diffuses reactant gases and transmits generated electricity. The gasket provides an airtight seal for the reactant gases and a coolant. The sealing member provides a bonding pressure to the gasket. The bipolar plate separator supports the MEA and GDL, collects and transmits the generated electricity, transmits the reactant gases, transmits and removes reaction products, and transmits the coolant to remove reaction heat, etc. Typically, a fuel cell vehicle requires one module stack, which comprises a plurality of MEAs, GDLs, and separators and two end plates, and each MEA has flow passageways through which hydrogen, air, and coolant flow.

Extensive research aimed at developing a system for manufacturing high quality MEAs to facilitate mass production of fuel cells for vehicles has continued to progress, and the necessity for a system for automatically bonding the MEA and the GDL and simultaneously processing the flow fields increases.

Conventionally, the manufacturing processes of the MEAs such as workpiece supply, stamping, bonding, etc. are performed manually increasing the potential risk of safety accidents during pressing, and may be unsuitable for mass production of next-generation vehicles. Moreover, the stamping process and the bonding process are performed separately, decreasing efficiency of the manufacturing.

Moreover, although a system for automatically performing the workpiece supply, the stamping process, and the bonding process have been developed, the stamping process and the bonding process are performed separately.

However, most of the currently available manufacturing systems have complex structures, poor efficiency in terms of linked operation between the respective processes, require large areas for installation, and require long production cycle times, which are disadvantageous for mass production.

The above information disclosed in this Background section is only for enhancement of understanding of the background of the invention and therefore it may contain information that does not form the prior art that is already known in this country to a person of ordinary skill in the art.

SUMMARY

The present invention provides a system for manufacturing a membrane electrode assembly of a fuel cell stack, in which the system is automated to perform the entire process including loading, clamping, bonding, and stamping a workpiece, and removing scraps after extracting the workpiece and, in particular, to integrally perform the bonding and stamping processes, thus reducing the space required for installation of the system, reducing the production cycle time, and facilitating mass production.

In one embodiment, the present invention provides a system for manufacturing a membrane electrode assembly of a fuel cell stack, the system comprising: an upper die portion including a first heater plate configured to heat a workpiece and a blade to stamp the workpiece, wherein the heater plate moves up and down; a lower die portion including a second heater plate configured to heat the workpiece and a flow field configured to absorb and support the workpiece; a driving portion configured to move the upper die portion up and down and includes a motor and a link arm connected to an output shaft of the motor while simultaneously connected to a guide shaft of the upper die portion; and a clamp portion configured to clamp the workpiece by receiving power from the driving portion in conjunction with a rod, a shaft, and a clamp which are operated by rotation of a cam plate mounted on the output shaft of the motor.

In an exemplary embodiment, the lower die portion may further comprise a wear seat, in contact with the blade, and a moving plate, wherein the wear seat and the moving plate may be connected to a ratchet wheel configured to move the wear seat and the moving plate horizontally to prevent the wear seat and the moving plate from being repeatedly damaged.

In another exemplary embodiment, the lower die portion may comprise a spring plate including a plurality of disc springs, wherein the spring plate is disposed on a lower surface of the second heater plate to absorb the impact applied by the up and down movement of the upper die portion.

In still another exemplary embodiment, the clamp portion may comprise an eccentric shaft and a cam plate mounted on the output shafts of the motor, a roller block in contact with a cam curved surface of the cam plate, the rod extending upward from the roller block, a link block connected to an upper end of the rod is configured to rotate, the shaft connected to the link block is disposed along the lateral side of the lower die portion, and the clamp connected to the shaft through a link bar is configured to move forward and backward to clamp and unclamp the workpiece.

In yet another exemplary embodiment, the clamp of the clamp portion may be inserted into a slot in the clamp block through a pin at both sides of the clamp block and guided along the slot to move forward and backward.

In still yet another exemplary embodiment, the system of the present invention may further comprise a scrap removing portion including a cylinder disposed horizontally along the lateral side of the lower die portion, a cylinder bar connected to a rod of the cylinder, a holder block having a pinion portion engaged with a rack portion at a front end of the cylinder bar, wherein the holder block is rotatably mounted, and a bar for scrap removal in the form of an elongated bar, of which a rear end is supported on an upper end of the holder block, rotated together with the holder block and to enter a working area to remove scraps.

BRIEF DESCRIPTION OF THE DRAWINGS

The above and other features and advantages of the present invention will now be described in detail with reference to exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in workpiece by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
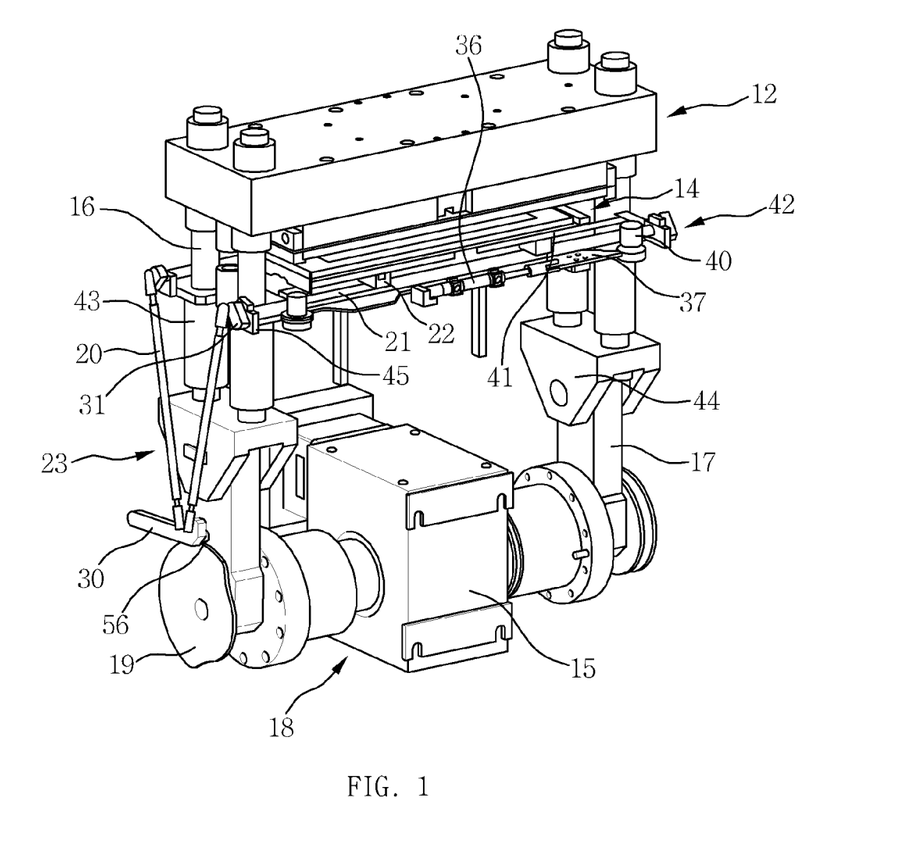
FIG. 1 is an exemplary view illustrating a system for manufacturing a membrane electrode assembly, in accordance with an exemplary embodiment of the present invention.
Figure 2:
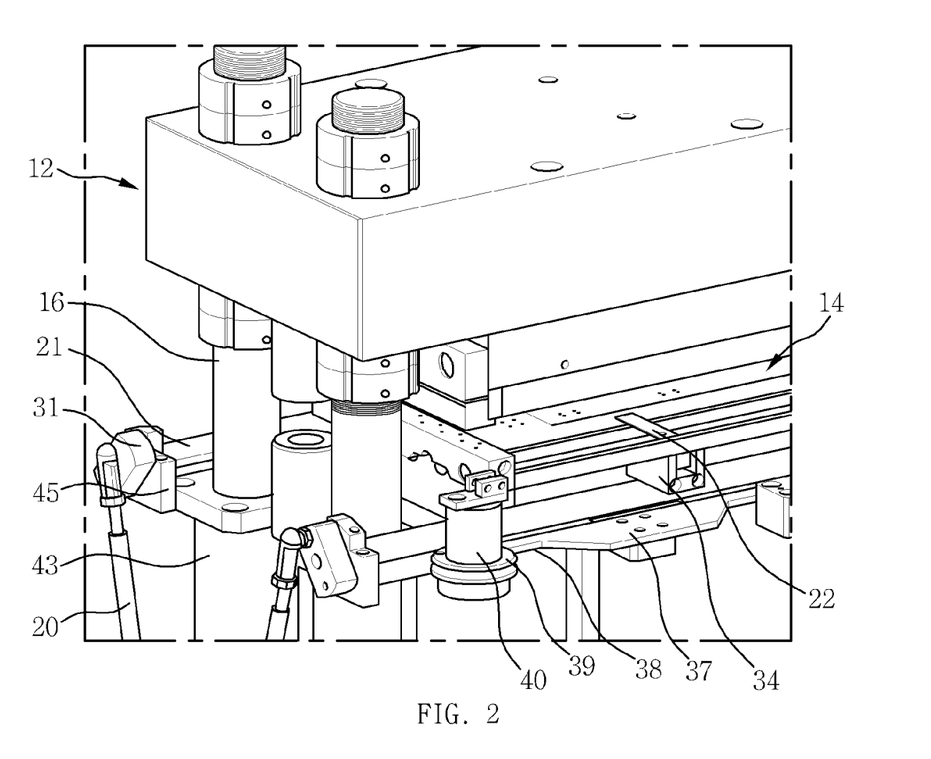
FIG. 2 is an exemplary enlarged view of "A" in FIG. 1.

FIG. 1 is an exemplary view illustrating a system for manufacturing a membrane electrode assembly, in accordance with an exemplary embodiment of the present invention, and FIG. 2 is an exemplary enlarged view of "A" in FIG. 1.

As shown in FIGS. 1 and 2, a system for manufacturing a membrane electrode assembly automatically performs the entire process in which after loading a workpiece (MEA and GDL), bonding and stamping the workpiece are performed in a single process, and lastly, removing scraps remaining in the system is performed.

In the system, an upper die portion 12 and a lower die portion 14 may be disposed vertically in parallel at the top of a system body (not shown), and a driving portion 18 for driving the upper die portion 12 may be disposed at a bottom of the system body. Furthermore, the lower die portion 14 may be disposed and supported on a base (not shown) of the system body, and the upper die portion 12 may be supported on the base and configured to move vertically through four guide shafts 16 slidably inserted into four guide bushes 43 disposed in the base. The configurations of the upper die portion 12 and the lower die portion 14 will be described in detail later.

The driving portion 18 allows the upper die portion 12 to move vertically and may include a motor 15 and a link arm 17. The motor 15 may be a type of servo motor, in which output shafts extend from both sides of the motor 15 and a lower end of the link arm 17 is connected to each end of the output shafts. Moreover, an upper end of the link arm 17 may be connected to the lower ends of the guide shafts 16 of the upper die portion 12, and an adapter 44 may be used as a connecting medium.

Furthermore, the adapter 44 may be connected to the link arm 17 by a pin and may be directly connected to the guide shaft 16. Thus, the connecting portion of the link arm 17 at the guide shaft 16 may perform a reciprocating motion, the connecting portion of the link arm 17 at an output shaft may perform a rotational motion, and the link arm 17 may perform a pendulum motion. Accordingly, when the motor 15 of the driving portion 18 is driven, the link arm 17 may move as a connecting rod by the rotation of the output shaft, and thus the upper die portion 12 may move vertically corresponding to the link arm 17.

In particular, a clamp portion 23 may be provided to clamp the workpiece prior to bonding and stamping of the workpiece. The clamp portion 23 has no separate power and may be operated by power provided by the driving portion 18. When the power is provided by the driving portion 18, the clamp portion 23 may clamp or unclamp the workpiece in conjunction with the respective components thereof.

Additionally, an eccentric shaft 29 and a cam plate 19 may be mounted on an end (e.g., at a position outside the link arm) of the output shaft of the motor 15 of the driving portion 18, a roller block 30 having a roller 56 may be disposed immediately above the cam plate 19, and the roller block 30 may come in contact with a cam curved surface of the cam plate 19 and may be supported thereon using the roller 56. Accordingly, when the cam plate 19 rotates, the cam plate 19 may move along the cam curved surface relative to the roller 56 and thus moves vertically along the shape of the cam curved surface.

Lower ends of two rods 20 may be connected to the roller block 30 by a plurality of pins, and an upper end of each of the connected rods 20 may be connected to a link block 31 by a pin. Further, the connecting portion of the upper end of the rod 20 may be disposed above the connecting portion of a shaft 21 of the link block 31. Thus, when the rod 20 moves vertically to horizontally move an upper end of the link block 31, (e.g., when the link block 31 is rotated with respect to the shaft 21) the shaft 21 integrally connected to the link block 31 may rotate.

The two rods 20 may have a "V" shape and extend toward the shafts 21 disposed at both sides of the lower die portion 14. The shafts 21 may be disposed in parallel at both sides of the lower die portion 14 and may be supported on brackets 45 disposed on the base, and a plurality of clamps 22 for substantially clamping the workpiece may be disposed at regular intervals on the shafts 21.

Figure 7:
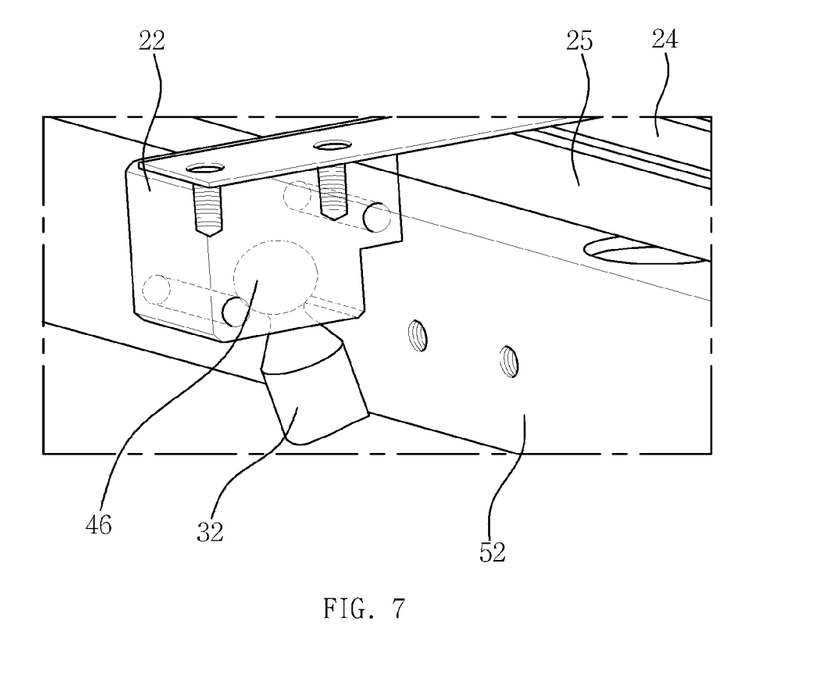
FIG. 7 is an exemplary enlarged view illustrating a clamp of a clamp portion in a system for manufacturing a membrane electrode assembly, in accordance with an exemplary embodiment of the present invention.

In other words, as shown in FIG. 7, a link bar 32 may extend from the shaft 21, and a ball 46 at an upper end of the link bar 32 may be connected to a bottom surface of the clamp 22. Thus, the clamp 22 may move forward and backward by the link bar 32 tilted by the rotation of the shaft 21. By the forward and backward movement of the clamp 22, the workpiece may be clamped (e.g., moved forward) and unclamped (e.g., moved backward).

Figure 8:
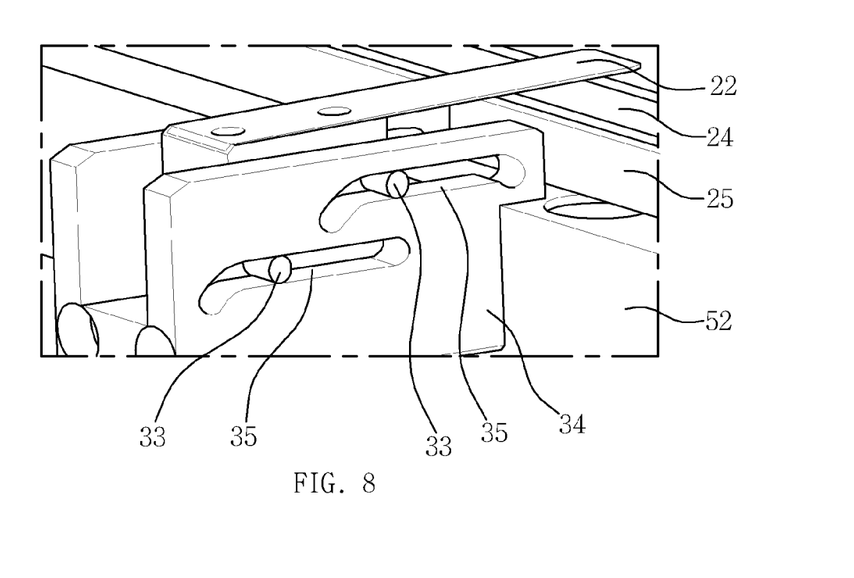
FIG. 8 is an exemplary enlarged view illustrating a clamp block of the clamp portion in a system for manufacturing a membrane electrode assembly, in accordance with an exemplary embodiment of the present invention.

Moreover, as shown in FIG. 8, a clamp block 34 may be provided for forward and backward linear movement of the clamp 22. The clamp block 34 may be fixed on the base and may include two slots 35 formed vertically on a wall of the clamp block. Accordingly, the clamp 22 located within the clamp block 34 may be inserted into the slots 35 in the clamp block 34 by a plurality of pins 33 at both sides thereof, and thus when the link bar 32 is tilted, the clamp 22 may perform the forward and backward linear movement by the pins 33 guided along the slots 35.

Figure 3:
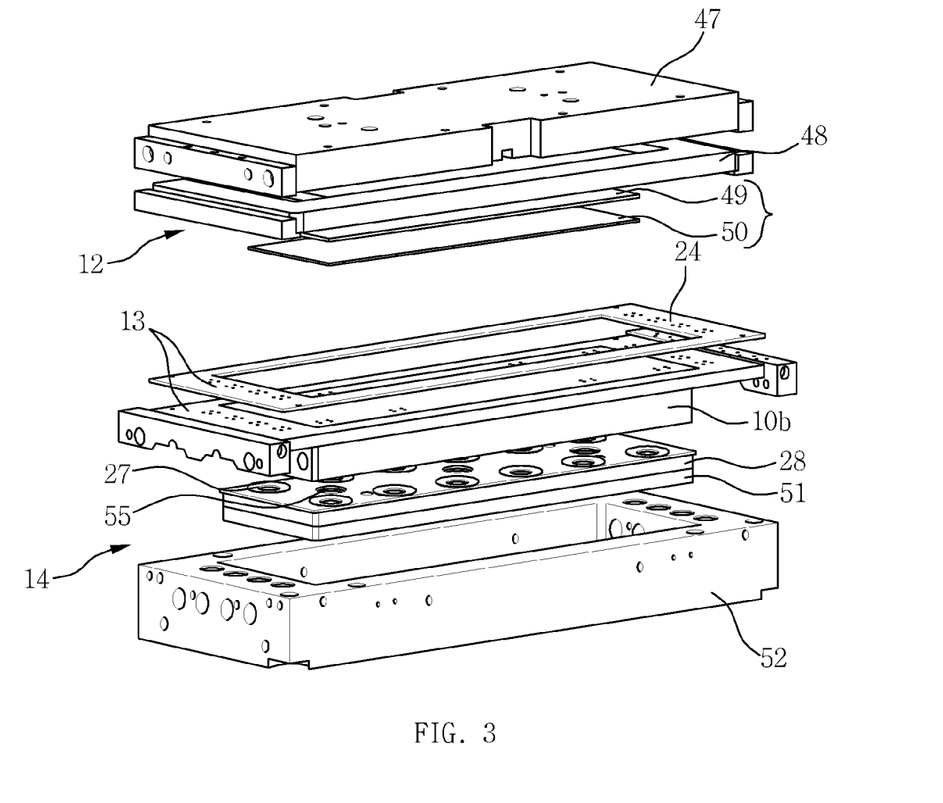
FIG. 3 is an exemplary enlarged view illustrating an upper die portion and a lower die portion in a system for manufacturing a membrane electrode assembly, in accordance with an exemplary embodiment of the present invention.

FIG. 3 is an exemplary enlarged view illustrating the upper die portion and the lower die portion in the system for manufacturing a membrane electrode assembly, in accordance with the exemplary embodiment of the present invention.

As shown in FIG. 3, the upper die portion 12 and the lower die portion 14 are configured to substantially bond and stamp the workpiece. The upper die portion 12 may include a first heater plate 10*a* configured to heat the workpiece and a blade 11 for stamping the workpiece and may move vertically to press the workpiece. The lower die portion 14 may include a second heater plate 10*b* and a plurality of flow fields 13 configured to absorb and support the workpiece.

Figure 4:
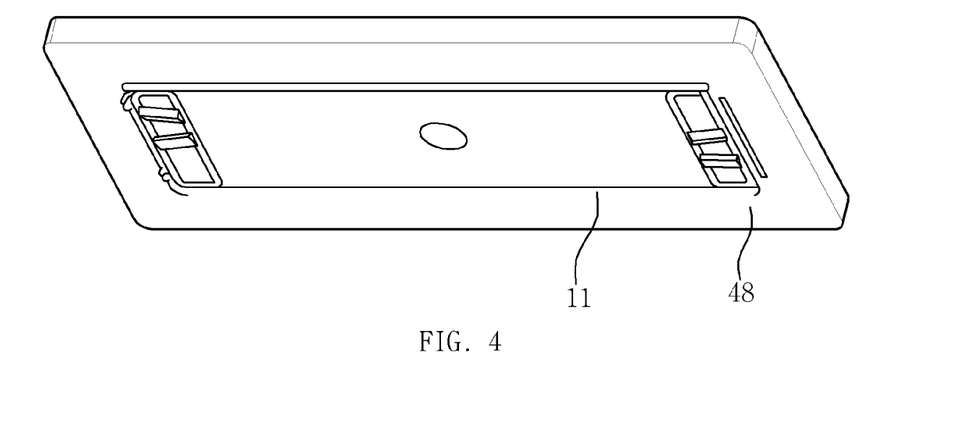
FIG. 4 is an exemplary enlarged view illustrating a wood mold of the upper die portion in a system for manufacturing a membrane electrode assembly, in accordance with an exemplary embodiment of the present invention.

Specifically, the upper die portion 12 may have a structure in which an upper die 47, a wood mold 48 including the blade 11 mounted at the lower surface thereof, and the heater plate 10*a* comprising a rubber heater plate and silicone heater plate 49 and an upper heater plate 50 may be sequentially stacked. As shown in FIG. 4, the blade 11 may be built in the wood mold 48 to stamp a membrane electrode assembly (MEA). The rubber heater plate and silicone heater plate 49 may include a heating wire for heating during the bonding process and a temperature sensor used in the temperature range of 70 to 200° C.

Figure 5:
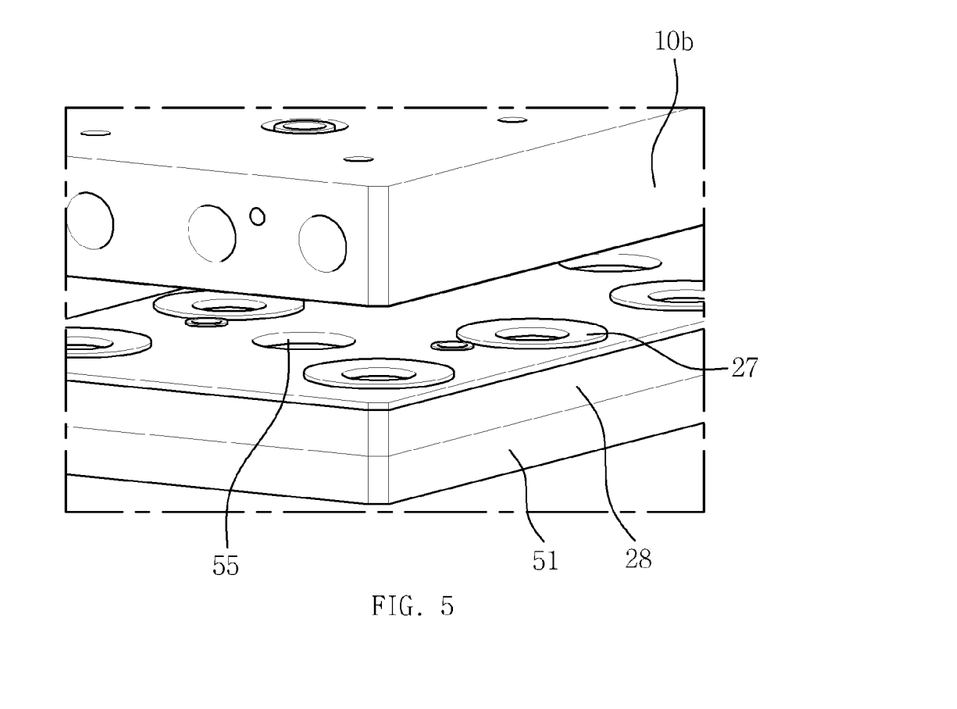
FIG. 5 is an exemplary enlarged view illustrating a heater plate and a disc spring in a system for manufacturing a membrane electrode assembly, in accordance with an exemplary embodiment of the present invention.

Moreover, the lower die portion 14 may have a structure in which a wear seat 24, a moving plate 25, a heat plate 10*b*, a spring plate 28 having a disc spring 27, an insulator plate 51, and a lower plate 52 may be sequentially stacked. A plurality of disc springs 27 may be mounted over the entire area of the spring plate 28 of the lower die portion 14 to absorb the impact applied during the vertical movement of the upper die portion 12. The wear seat 24 may be in direct contact with the blade 11 and may be damaged when the blade 11 repeatedly contacts the same point of the wear seat 24.

Figure 6:
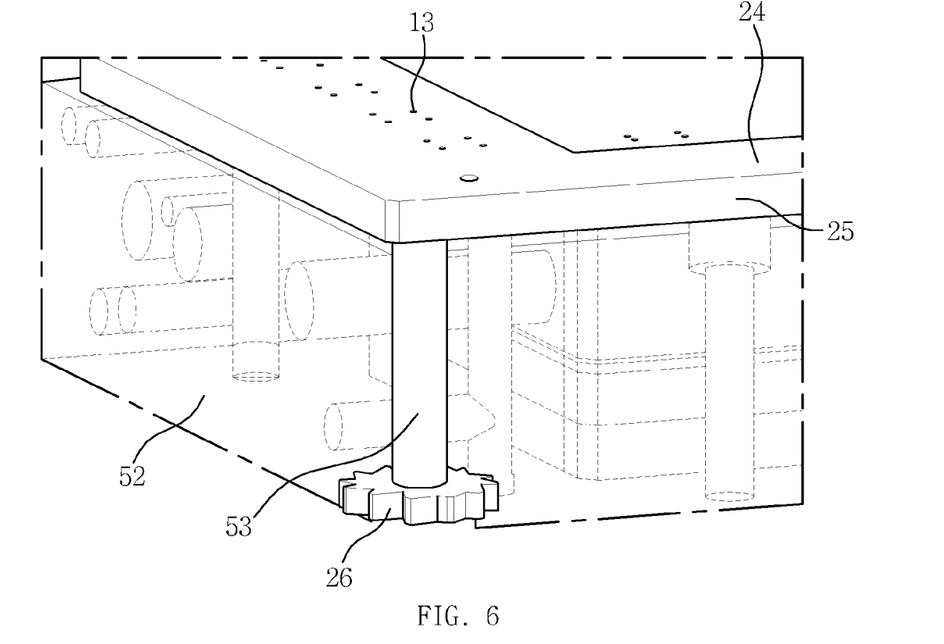
FIG. 6 is an exemplary enlarged view illustrating a heater plate and a disk spring in a system for manufacturing a membrane electrode assembly, in accordance with an exemplary embodiment of the present invention.

Moreover, as shown in FIG. 6, an axis 53 may be vertically disposed below the wear seat 24 and the moving plate 25, a ratchet wheel 26 may be mounted at a bottom of the axis 53, and an upper end of the axis 53 may be in surface contact with a lower surface of the moving plate 25 in an eccentric manner. Accordingly, when the axis 53 is rotated by power from the ratchet wheel 26, the moving plate 25 including the wear seat 24 supported on the upper end of the axis 53 may be slightly moved horizontally, thus preventing the repeated damage at the same point of the wear seat 24.

Figure 9:
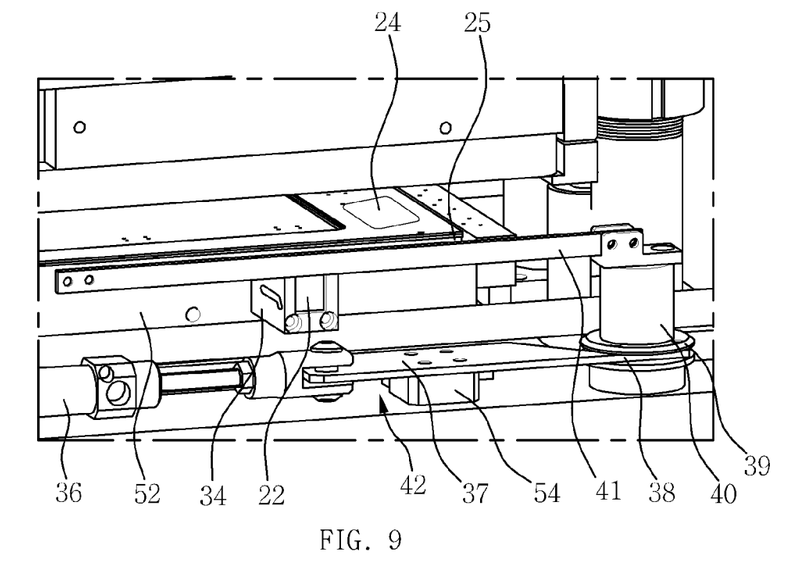
FIG. 9 is an exemplary enlarged view illustrating a scrap removing portion in a system for manufacturing a membrane electrode assembly, in accordance with an exemplary embodiment of the present invention.

Furthermore, the power for rotating the ratchet wheel 26 may use the power of a cylinder 36 which will be described later. For example, a block 54 having a hook (not shown) and a spring (not shown) may be mounted on a cylinder bar 37 of a scrap removing portion 42, and during operation of the cylinder 36, the block 54 may move forward and backward to rotate the ratchet wheel 26 through the hook, thus allowing the movement of the wear seat 24 and the moving plate 25 by the rotation of the ratchet wheel 26.

In particular, a plurality of air suction holes 55 may be formed in a lower plate 52 of the lower die portion 14. Thus, when air is suctioned through the air suction holes 55, the suction force may be applied to the workpiece through the plurality of flow fields 13 formed in the wear seat 24 and the moving plate 25, and thus the workpiece may be adsorbed onto the upper surface of the wear seat 24 and stably fixed.

FIG. 9 is an exemplary enlarged view illustrating the scrap removing portion in the system for manufacturing a membrane electrode assembly, in accordance with the exemplary embodiment of the present invention.

As shown in FIG. 9, the scrap removing portion 42 may be configured to remove residue of the MEA to the exterior of the system upon completion of the process and remove scraps using the power of the cylinder 36. Furthermore, the cylinder 36 may be disposed along the lateral side of the lower die portion 14 and supported on the base through a rear end thereof. The cylinder bar 37 in the form of an elongated bar may be connected to a rod of the cylinder 36, and a rack portion 38 may be disposed at an end of the cylinder bar 37.

Moreover, a holder block 40 may be rotatably disposed on the base in a position adjacent to the rack portion 38, and a pinion portion 39 engaged with the rack portion 38 of the cylinder bar 37 may be disposed on the holder block 40.

Furthermore, a bar 41 for scrap removal in the form of an elongated bar may be horizontally installed at an upper end of the holder block 40 and supported by the rear end of the holder block. The bar 41 for scrap removal may rotate together with the holder block 40 and enter a working area. The bar 41 for scrap removal entering the working area may brush the upper surface of the wear seat 24 to remove the residue of the MEA placed thereon.

Additionally, the system may include a plurality of bars 41 for scrap removal and each of the bars 41 for scrap removal may be operated by the operation of each cylinder or may be linked to one cylinder by a link mechanism and operated together.

The use (e.g., operation state) of the system for manufacturing the membrane electrode assembly constructed in the above manner will be described. FIGS. 10A to 10D are exemplary schematic diagrams showing the use of the system for manufacturing the membrane electrode assembly in accordance with the exemplary embodiment of the present invention.

As shown in FIGS. 10A to 10D, the eccentric shaft and the cam plate may be rotated by the motor, and the workpiece (GDL and MEA) may be fixed by the mechanical movement of the rod, the shaft, and the clamp based on the phase change of the cam plate. Simultaneously, the upper die portion may move downward to perform the bonding and stamping processes, and when the upper die portion moves upward, the MEA may be discharged. Further, the process of removing the residue generated during the stamping process may be repeated by the scrap removing portion. The above processes for manufacturing the MEA are automatically performed.

This automated process will be described in more detail below.

Figure 10A:
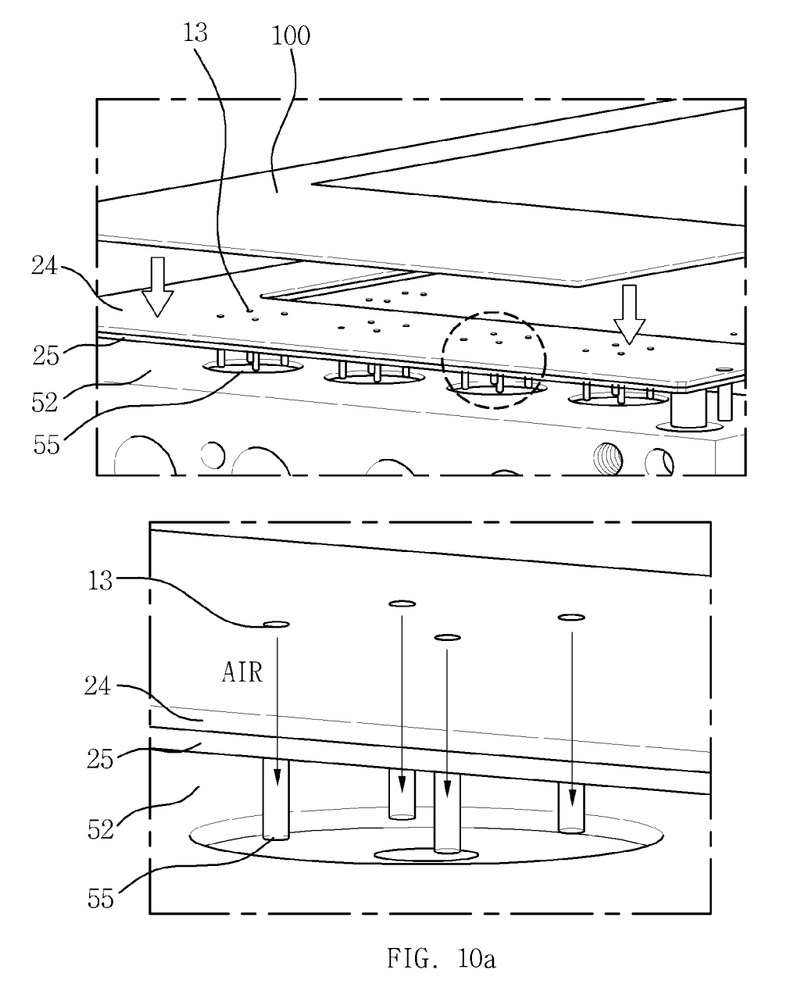
FIGS. 10A to 10D are exemplary schematic diagrams illustrating the use of a system for manufacturing a membrane electrode assembly, in accordance with an exemplary embodiment of the present invention.

First, a workpiece comprising two GDLs 100a and one MEA 100b may be loaded on the wear seat 24 of the lower die portion 14 by a robot, for example. Further, as shown in FIG. 10A, air may be suctioned through the flow fields 13 and the air suction holes 55 penetrating the wear seat 24, the moving plate 25, and the lower plate 52, and thus the workpiece 100 may be adsorbed onto the upper surface of the wear seat 24.

Figure 10B:
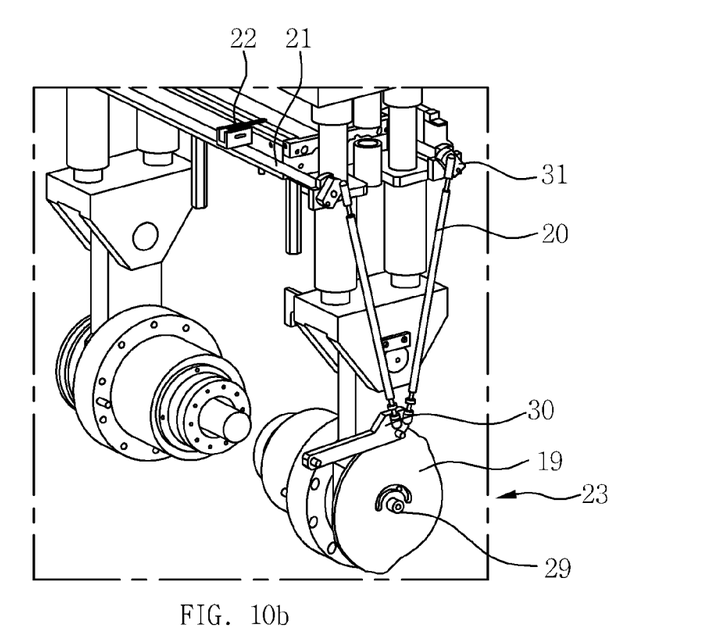
Figure 10C:
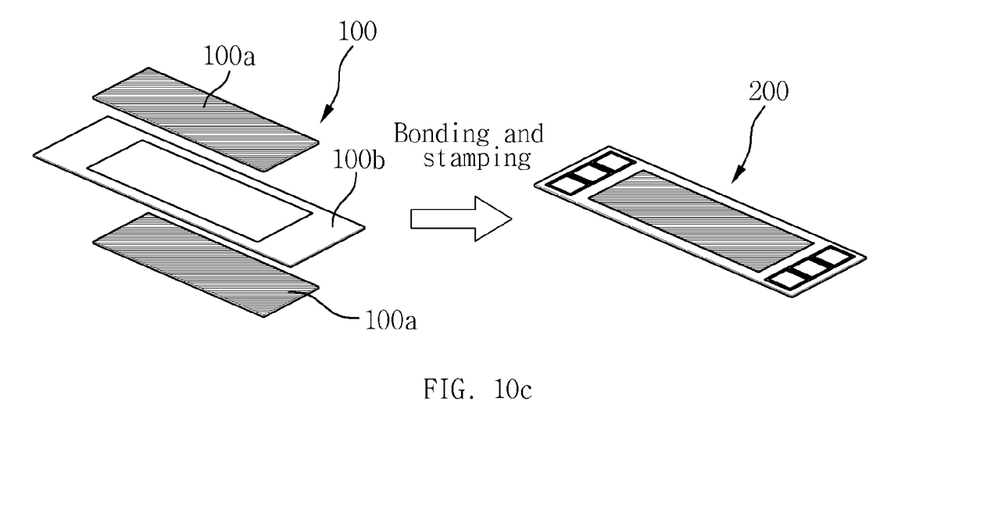
Figure 10D:
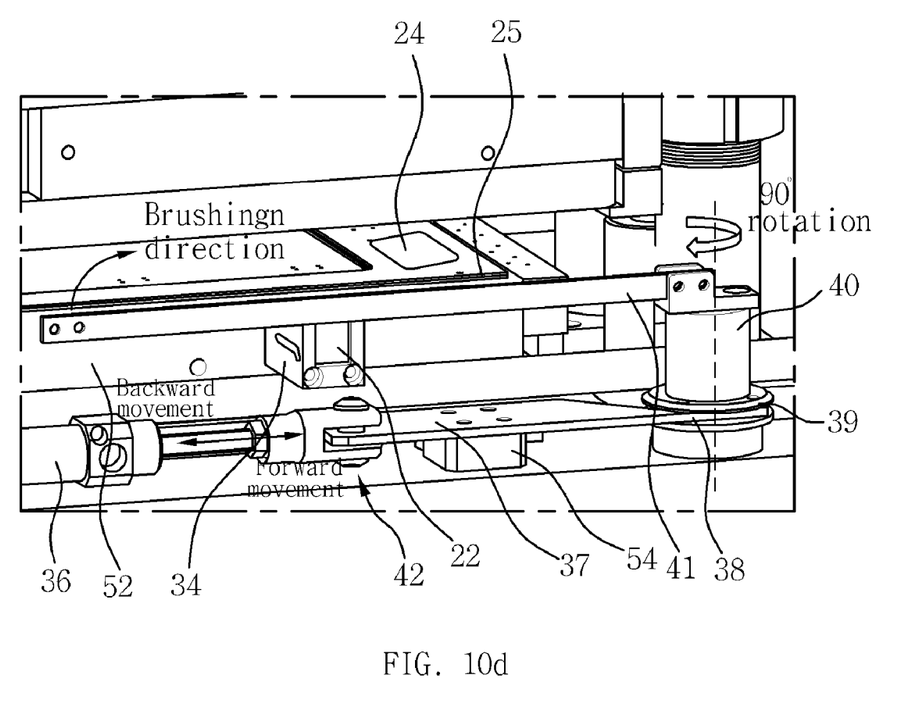

Additionally, as shown in FIG. 10B, as the cam plate 19 rotates, the shaft 21 connected to the rods 20 may rotate within a predetermined range, and thus the clamp 22 may move forward by the rotation of the shaft 21 to clamp the upper surface of the workpiece 100 adsorbed onto the wear seat 24. Further, the bonding and stamping processes may be performed on the workpiece 100 stably fixed.

In other words, when the upper die portion 12 moves downward toward the lower die portion 14, the workpiece 100 may be heated and bonded by the first and the second heater plate 10a and 10b and simultaneously the workpiece may be processed into a final shape by the blade 11 in the wood mold 48.

Upon completion of the process, while the four clamps 22 move backward, when the workpiece (denoted by reference numeral 200 in FIG. 10C) is extracted by the robot, for example, residues of the stamped MEA may remain. When the cylinder 36 moves backward, the bars 41 for scrap removal at both sides may rotate 90 degrees to remove scraps and, when the cylinder 36 moves forward, the bars 41 for scrap removal may return to the initial positions.

As described above, the system for manufacturing the membrane electrode assembly of the fuel cell stack provided according to the present invention provides the following advantages.

First, it may be possible to reduce the required installation area of the system by integrating the bonding and stamping processes for the MEA and the GDL. In other words, it may be possible to significantly reduce the installation area compared to existing systems using separate processes. Second, it may be possible to simplify the system, thereby facilitating the manufacturing of the system and reducing the manufacturing cost of the system. Third, it may be possible to reduce the production cycle time of the fuel cell stack by integrating the processes, thus facilitating mass production. Fourth, it may be possible to improve the quality of the membrane electrode assembly by the integrated process.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A system for manufacturing a membrane electrode assembly of a fuel cell stack, the system comprising:
    an upper die portion including a first heater plate configured to heat a workpiece and a blade configured to stamp the workpiece, wherein the upper die portion moves vertically;
    a lower die portion including a second heater plate configured to heat the workpiece and a flow field configured to absorb and support the workpiece;
    a driving portion configured to move the upper die portion vertically, wherein the driving portion includes a motor and a link arm connected to an output shaft of the motor and, simultaneously connected to a guide shaft of the upper die portion; and
    a clamp portion configured to clamp the workpiece by receiving power from the driving portion in conjunction with a rod, a shaft, and a clamp operated by a rotation of a cam plate mounted on the output shaft of the motor,
    wherein the lower die portion further comprises:
    a wear seat in contact with the blade; and
    a moving plate, wherein the wear seat and the moving plate are connected to a ratchet wheel configured to move the wear seat and the moving plate horizontally to prevent the wear seat and the moving plate from being repeatedly damaged.

2. The system of claim 1, wherein the lower die portion comprises a spring plate including a plurality of disc springs, wherein the spring plate is disposed on a lower surface of the second heater plate to absorb the impact applied by the vertical movement of the upper die portion.

3. The system of claim 1, wherein the clamp portion comprises:
    an eccentric shaft and the cam plate mounted on the output shaft of the motor;
    a roller block in contact with a cam curved surface of the cam plate, wherein the rod extends upward from the roller block; and a link block connected to an upper end of the rod, wherein the shaft connected to the link block and disposed along a lateral side of the lower die portion, and the clamp connected to the shaft through a link bar are configured to move forward and backward to clamp and unclamp the workpiece.

4. The system of claim 1, wherein the clamp of the clamp portion is inserted into a slot in a clamp block through a pin at both sides and guided along the slot to move forward and backward.

5. The system of claim 1, further comprising:
- a scrap removing portion including a cylinder disposed horizontally along the lateral side of the lower die portion;
- a cylinder bar connected to a rod of the cylinder;
- a holder block including a pinion portion engaged with a rack portion at a front end of the cylinder bar, wherein the holder block is rotatably mounted on the cylinder bar; and
- a bar for scrap removal in the form of an elongated bar, wherein a rear end of the bar is supported on an upper end of the holder block and is configured to rotate together with the holder block and enter a working area to remove scraps.

* * * * *